US00RE41748E

(19) United States
(12) Reissued Patent
Jain et al.

(10) Patent Number: US RE41,748 E
(45) Date of Reissued Patent: *Sep. 21, 2010

(54) TUNABLE BRAGG GRATING AND DEVICES EMPLOYING THE SAME

(76) Inventors: Ravinder Jain, 1041 Royal Birkdale NE., Albuquerque, NM (US) 87111; Balaji Srinivasan, 1/B7 Thirvuerdhi Amman Koil Street, R.A. Puram, Chennai 600 028 (IN)

( * ) Notice: This patent is subject to a terminal disclaimer.

(21) Appl. No.: 11/440,782

(22) Filed: May 24, 2006

Related U.S. Patent Documents

Reissue of:
(64) Patent No.: 6,534,248
Issued: Mar. 18, 2003
Appl. No.: 09/768,048
Filed: Jan. 24, 2001

U.S. Applications:

(62) Division of application No. 11/084,868, filed on Mar. 18, 2005, which is a division of application No. 09/246,125, filed on Feb. 8, 1999, now Pat. No. 6,221,565.
(60) Provisional application No. 60/074,040, filed on Feb. 9, 1998.

(51) Int. Cl.
*G02B 6/02* (2006.01)

(52) U.S. Cl. ..... 430/321; 430/320; 385/8; 385/10; 385/40; 385/123; 216/24; 216/37
(58) Field of Classification Search ..... None
See application file for complete search history.

(56) References Cited

U.S. PATENT DOCUMENTS 5,159,601 A * 10/1992 Huber ..... 372/6
5,239,407 A 8/1993 Brueck et al.
5,247,601 A 9/1993 Myers et al.
5,317,576 A * 5/1994 Leonberger et al. ..... 372/6
5,412,743 A 5/1995 Brazas, Jr.
5,617,499 A 4/1997 Brueck et al.
5,768,462 A 6/1998 Monte
5,830,622 A 11/1998 Canning et al.
6,221,565 B1 4/2001 Jain et al.

FOREIGN PATENT DOCUMENTS

EP 0 794 450 A1 9/1997
GB 2 190 741 A 11/1987
WO WO 90/08970 8/1990

OTHER PUBLICATIONS

Fujiwara et al. "UV excited poling and electrically tunable Bragg gratings in a Germanosilicate fiber", Optical Fiber Communications '95 Technical digest (post conference edition) pp. 347–350 (Mar. 1995).*

Fujiwara et al., "UV—Excited Poling and Electrically Tunable Bragg Gratings in a Germanosilicate Fiber", Optical Fibre Technology Centre, The University of Sydney, NSW 2006, Australia.*

* cited by examiner

*Primary Examiner*—Martin J Angebranndt
(74) *Attorney, Agent, or Firm*—Michael J. Donohue; Davis Wright Termaine LLP

(57) ABSTRACT

The present invention relates generally to electro-optically active waveguide segments, and more particularly to the use of a selective voltage input to control the phase, frequency and/or amplitude of a propagating wave in the waveguide. Particular device structures and methods of manufacturing are described herein.

31 Claims, 5 Drawing Sheets

TUNABLE BRAGG GRATING AND DEVICES EMPLOYING THE SAME

Matter enclosed in heavy brackets [ ] appears in the original patent but forms no part of this reissue specification; matter printed in italics indicates the additions made by reissue.

CROSS-REFERENCE TO RELATED APPLICATIONS

[The present application is a division of co-pending U.S. patent application No. 09/246,125, entitled "Tunable Bragg Gratings and Devices Employing the Same," now U.S. Pat. No. 6,221,565, filed Feb. 8, 1999, which in turn claims the prioruy of U.S. Provisional Application No. 60/074,040, entitled "Advanced Electro-Optic Poled Waveguide Devices and New Lightwave System Applications Thereof" filed Feb. 9, 1998, now abandoned. The entire disclosure and contents of the above-mentioned applications are hereby incorporated by reference.]

*This application is a divisional of Reissue application Ser. No. 11/084,868, filed on Mar. 18, 2005, now abandoned which is a reissue of U.S. Pat. No. 6,534,248 B2, which is a divisional of Ser. No. 09/246,125 filed Feb. 8, 1999, now patent U.S. Pat. No. 6,221,565, which claims benefit of 60/074,040, filed Feb. 9, 1998. Other divisional applications of Reissue application Ser. No. 11/084,868 are Ser. No. 10/440,783, filed May 24, 2006, pending and Ser. No. 10/440,781, filed May 24, 2006, pending.*

This application refers to the following U.S. Patents. The first is U.S. Pat. No. 5,617,449, entitled "Technique for Fabrication of a Poled ElectroOptic Fiber Segment," issued Apr. 1, 1997. The second is U.S. Pat. No. 5,830,622, entitled "Optical Grating," issued Nov. 3, 1998. Both of these applications are hereby incorporated by reference.

This invention is made with government support under AFSOR grant number F49620-96-1-0079, awarded by the United States Department of Defense. The government may have certain rights in this invention.

BACKGROUND OF THE INVENTION

1. Field of the Invention

The present invention relates generally to electro-optically active waveguide segments, and more particularly to the use of a selective voltage input to control the phase, frequency and/or amplitude of a propagating wave in the waveguide.

2. Description of the Prior Art

Modulation and switching of optical signals are basic functions in an optical communication system. Through modulation, the information to be communicated is expressed in one or more parameters of a light signal, such as the amplitude, the polarization, the phase or frequency of the field, or of the magnitude or spatial distribution of the power and/or intensity. Through switching, the light signal may be routed through a network of optical nodes and connections. Optical connections are mostly realized with the help of glass fibers.

Moreover, standard glass fibers are not polarization-retaining, whereas many optical devices, such as receivers, switches, and modulators, are polarization sensitive. With a view towards low cost mass production, precisely integrated embodiments are of great importance for large-scale introduction such as, e.g., in optical communication and/or distribution networks with large numbers of connections.

Therefore, a cheap, stable and electrically controllable polarization control devices are needed to satisfy a long felt need in the communications industry.

Several devices have been disclosed that provide phase control. For example, U.S. Pat. No. 5,239,407, by Brueck et al, discloses the use of thermal poling in a waveguide to establish a preferred non-linearity. One significant drawback to this approach is that this non-linearity may only be achieved along one axis. Additionally, the non-linearity is generated only on one side of the sample, e.g., the positive biased side of the sample and therefore docs not effect a wavefront in a consistent manner across the wavefront. Finally, to avoid breakdown, a significant portion of the cladding layer is removed and thus the optical loss in this device is significant.

Fujiwara et al. discloses, in an article entitled "UV Excited Poling and Electrically Tunable Bragg Gratings in a Germanosilicate Fiber," two innovations: 1) the use of an ultraviolet (UV) beam in combination with an applied electric field to produce poling; and 2) the use of two internal electrodes for applying a voltage across a Bragg grating. Their technique, however, has a number of drawbacks. Specifically, the fiber is drawn from a preform with two holes for electrode wires that are to be inserted following the fiber drawing. This wire insertion is a difficult manufacturing step. To avoid breakdown, one wire is inserted from each end of the fiber. This means that the modulation frequency is limited to low values since a high-speed travelling wave geometry is not possible. Furthermore, splicing to either end of the fiber is not possible because of the electrodes. Thus, discrete optical system alignment for coupling into the fibers would be necessary and would negate any benefit from an electro-optically active fiber segment. Additionally, the use of UV poling as taught by Fujiwara et al. has the added disadvantage of requiring custom fabrication of a preform that are relatively difficult to fabricate.

Finally, U.S. Pat. No. 5,617,499, by Brueck et al., discloses a poled electro-optic fiber segment as illustrated in FIG. 1 of the present application. The device comprises a first electrical contact 1, a fiber core 2, a cladding 3, and a second electrical contact 4. As may be seen, a significant portion of cladding 3 has been removed. Thus, the optical loss in this device may be significant. Additionally, the modulation frequency is limited to low values since a high-speed travelling wave geometry is significantly restricted. Finally, the Brueck et al. device is limited to temperature/electric poling because access to core 2 via cladding 3 is impaired by first electrical contact 1 and the bottom electrical contact 4 making it difficult to perform UV poling in such a structure. Further, poling using elevated temperatures may significantly degrade the reflectivity of a Bragg grating disposed in the poled waveguide.

Therefore, there needs to be an easily manufactured poled electro-optic fiber segment which allows for poling by: 1) voltage, 2) ultraviolet radiation, 3) thermal heating, or 4) any combination of the above.

The use of tunable Bragg gratings is known in the prior art. These gratings have been controlled by thermal tuning, piezoelectric tuning, Fabry-Perot tuning, and refractive index tuning in bulk semiconductors. Each of these methods of tuning has disadvantages associated with them. In particular, the speed of tuning is in the range of a few milliseconds for thermal tuning and a few μsec for piezoelectric tuning. Additionally, such methods have the disadvantage of applying stress on an optical fiber that can reduce the strength of the fiber over a period of time. Finally, these methods tend to be very bulky. On the other hand, integration of bulk non-linear materials such as lithium niabate to a fiber segment is lossy, expensive and is not desirable. Therefore, other methods of tuning a Bragg grating are needed.

The first optical grating or so-called Bragg grating was made in 1978 using the standing wave pattern originating from two counter-propagating beams in a Ge-doped core optical fiber. Since that time, techniques have been developed to exploit the photosensitivity of germanosilicate fibers, the photosensitivity being established by the bleaching of oxygen deficient centers by UV light to create the regions of differing refractive index. The refractive index change, which is induced by the UV light, arises from the creation of polarizable color centers and structural rearrangement of the glass network.

While these gratings have evolved, an efficient control system for this type of grating has not yet been demonstrated. Several attempts to develop such as control system have fallen short of the goal of a commercially usable device. For example, U.S. Pat. No. 5,617,499, by Brueck et al, discloses the use of a Bragg grating in a poled device, but provides no teaching of control. Additionally, Fujiwara et al. discloses the use of a Bragg grating in their device, but provides no teaching of control. Unfortunately, both these devices have the drawbacks discussed above.

Therefore, there needs to be an easily manufactured electro-optic fiber segment having a tunable Bragg Grating which reduces the possibly of breakdown during poling while achieving a smaller dimmension between electrodes without producing a high loss for the mode of propagation in the core region or without degrading the Bragg grating.

SUMMARY OF THE INVENTION

It is therefore an object of the present invention to provide a poled electro-optic waveguide segment which allows for poling by: 1) voltage, 2) ultraviolet radiation, 3) thermal heating, or 4) any combination of the above.

It is yet another object to provide a means for allowing polarization control of a signal in a waveguide by a selective voltage input.

It is a further object to provide an electro-optic fiber segment having a tunable Bragg grating which reduces the possibly of breakdown during poling while achieving a smaller dimmension between electrodes without producing a high ion for the mode of propagation in the core region or without degrading the Bragg grating.

It is yet another object to provide a tunable Bragg grating which does not increase signal loss due to attenuation in the cladding layer.

It is yet another object to provide optical systems which utilize tunable Bragg gratings and tunable bioinfringent devices.

In all of the above embodiments, it is an object to provide an electro-optic waveguide segment that may be easily attached to conventional waveguides.

Finally, it is an object of the invention to provide an electro-optic waveguide which may be poled by using an external electrode which is disposed in a recess in the cladding material.

Other objects and features of the present invention will be apparent from the following detailed description of the preferred embodiment.

BRIEF DESCRIPTION OF THE DRAWINGS

The invention will be described in conjunction with the accompanying drawings, in which.

DETAILED DESCRIPTION OF THE PREFERRED EMBODIMENT

Figure 1:
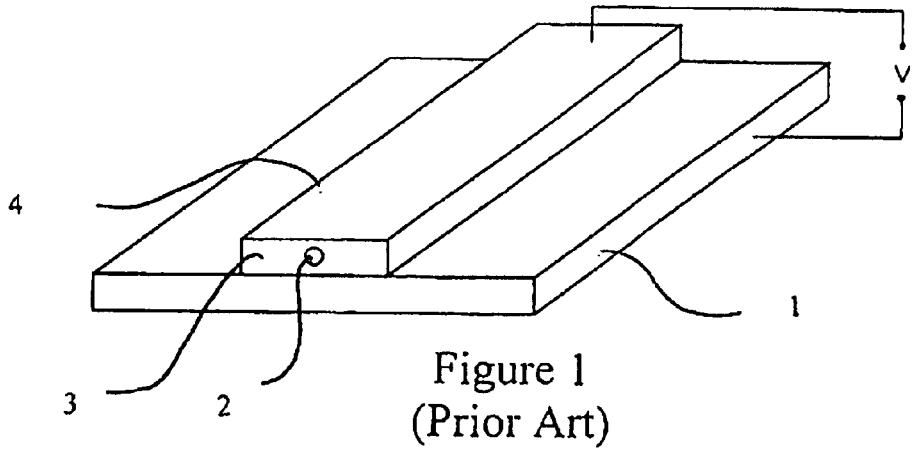
Figure 1 (Prior Art)
FIG. 1 is a perspective view of a prior art electro-optic waveguide segment.

Before a substantive discussion of the preferred embodiment may begin, it is essential to define several key terms.

The term "waveguide" is used in this application to mean any device used to channel an optical signal, at any frequency. Specific examples of waveguides include, but are not limited to: fiber-optic waveguides, planar glass, as well as crystalline and semiconductor waveguides.

The term "fiber optic cable" or "fiber optic waveguide" is used in this application to mean any waveguide utilized to guide light waves from one point to another. This definition specifically includes both single mode and multi-mode fibers as well as any waveguide having any cross-sectional shape. In addition, this term also includes any waveguide whether doped or undoped.

The term "input voltage" is used in this application to mean any voltage that is applied to the devices discussed below. In particular embodiments, specific voltages are used. Examples of these voltages include, but are not limited to: a DC voltage, an AC voltage, and pulsed voltage.

The term "electrical contact" is used in this application to mean any material having the property of electrical conductivity. Examples of electrical contacts include, but are not limited to: knife edges, cono-fusical projections, wires made with either metallic, semi-metallic or semi-conducting materials, and conventional planar and non-planar deposited materials.

The term "Bragg grating" is used in this application to mean a structure containing alternating periodic segments of varying periods of high and low refractive index material segments and/or appropriately embedded phase shift segments at well defined locations of the structure. A period is defined as one set of adjacent high and low refractive material segments. It is understood by this definition that the order of the high and low material is irrelevant, only that there is a change in refractive index between adjacent segments. While only uniform gratings are illustrated, non-uniform gratings are also contemplated within the scope of the invention.

The term "dopant" is used in this application to mean any extraneous element or combination thereof which is added to a material to enhance or suppress a characteristic of that material. Examples of dopants include, but are not limited to: germanium (Ge), hydrogen (H), sodium (Na), lithium (Li), lead (Pb), zirconium (Zr), zinc (Zn), erbium (Er), praseodymium (Pr), thulium (Tm), potassium (K) and calcium. The particular characteristics of interest in this application are photosensitivity of the material and/or non-linearity created due to poling.

The term "recess" or "groove" is used in this application to mean any removal of material in the cladding. The recess or groove is defined by a surface which is controlled by the variables R and $\alpha$. In a preferred embodiment, $\alpha$ would be between 0 and <=180 degrees and R would be between 0 and +infinity, and from −infinity to −r, i.e., having a concave or convex surface, respectively. Additionally, r is defined as the closet radius of curvature of a near circular waveguide core. It should be appreciated that recesses or grooves may be part of a preform or formed after waveguide creation. Additionally, recesses or grooves may or may not extend the entire direction of propagation of the waveguide.

Poled Electro-Optic Waveguide

Figure 2:
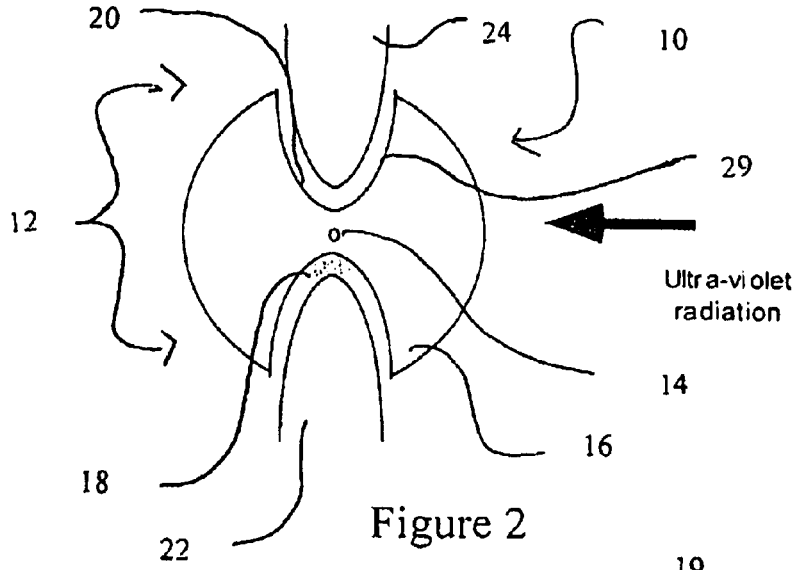
FIG. 2 is a cross sectional view of a electro-optic waveguide segment constructed in accordance with a preferred embodiment of the invention.

With reference to the Figures, wherein like references characters indicate like elements throughout the several views and, in particular, with reference to FIG. 2, a electro-optic waveguide segment 10 is illustrated. The electro-optic fiber segment 10 comprises a fiber-optic waveguide 12 having a core 14 and cladding 16. Disposed in contact with waveguide 12 is a first electrical contact 18 and a second electrical contact 20 preferably on opposite sides of waveguide 12.

It should be appreciated that any waveguide may be used in the poled electro-optic Device. The following discussion addresses the use of a fiber optic waveguide to illustrate how the teachings of the present invention may be utilized in an optical system. The teachings of this invention may be used with any of the waveguides defined above.

In a preferred embodiment waveguide 12 is a D-shaped fiber optic waveguide having a 2×4 μm core and having a germanium oxide ($GeO_2$) dopant with a concentration of between 0% and 30%. Preferably, a 15% $GeO_2$ doping would be utilized. Such a fiber is commercially available from KVH Corporation. It should be appreciated that while germanium is a preferred dopant, other dopants such as (but not limited to) hydrogen, sodium, lithium, lead, zirconium, and zinc may be utilized. The purpose of these dopants is to increase the photosensitivity of core 14 of waveguide 12. Therefore, any dopant may be utilized in conjunction with the teachings of this invention so long as the dopant has the property of enhancing photosensitivity.

Additionally, other approaches to increasing photosensitivity may be employed with the teachings of this invention. For example, the fabrication of waveguide 12 maybe conducted in a reduced pressure environment that has the effect of increasing photosensitivity of waveguide 12. It should be appreciated that the above example is merely illustrative of one way in which photosensitivity is effected by fabrication of waveguide 12 and that any other fabrication technique may be utilized with the teachings of this invention.

Figure 5:
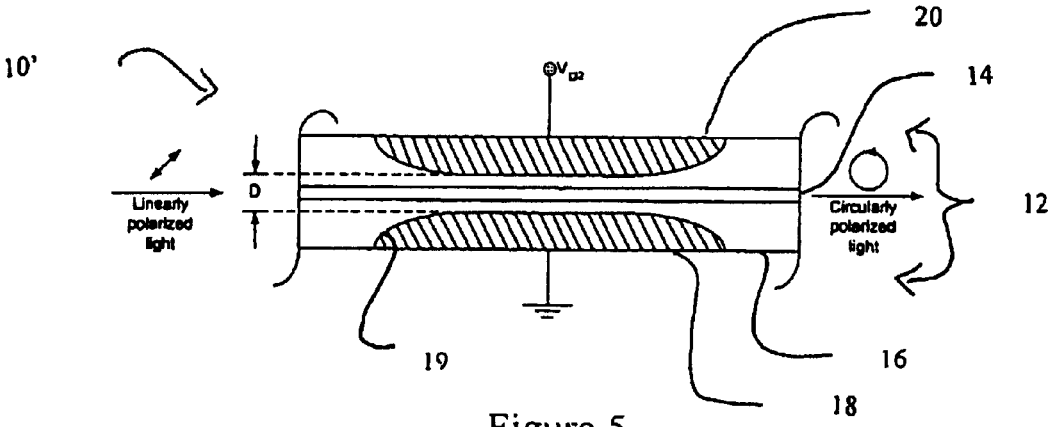
FIG. 5 is a cross sectional view of a electro-optic waveguide segment constructed in accordance with another alternate embodiment of the invention.
Figure 6:
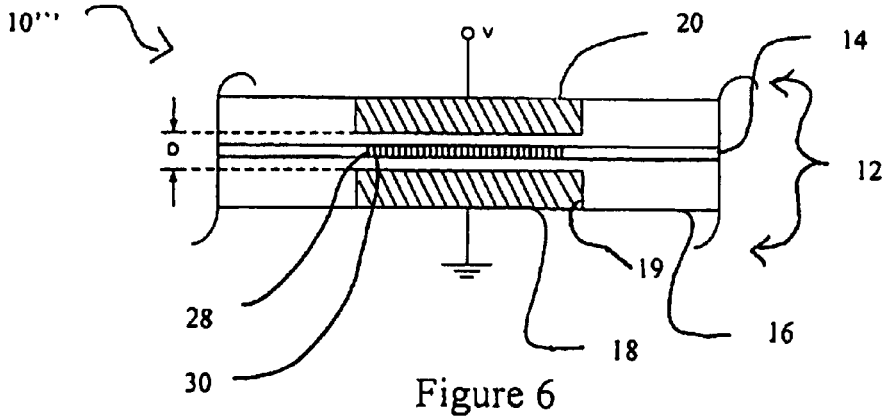
FIG. 6 is a cross sectional view of a electro-optic waveguide segment constructed in accordance with yet another alternate embodiment of the invention.

As may be seen in the fully manufactured device illustrated in FIGS. 5 and 6, a voltage is applied to second electrical contact 20. Contact 18 is in turn connected to ground and thus completes the electrical circuit. The specific voltage that is applied is critical in the operation of the device. Particular voltages and their effect shall be described in conjunction with the device descriptions provided below.

We shall first describe in general terms the manufacturing process for electro-optic fiber segment 10. As discussed above, a conventional waveguide 12 is utilized in this invention. This waveguide preferably is doped with a material that will enhance photosensitivity or is processed in a manner to allow for the same. Examples of dopants include, but are not limited to: germanium (Ge), hydrogen (H), sodium (Na), lithium (Li), lead (Pb), zirconium (Zr), zinc (Zn), erbium (Er), praseodymium (Pr), thulium (Tm), potassium (K) and calcium. These enhanced waveguides are commercially available and therefore will not be described in detail.

The first step is the formation of grooves 26 by the removal of selective portions of cladding 16 of the preform before waveguide 12 is drawn. The main purpose of this step is to assure that grooves 26 have an outer dimmension that is less than an unmodified section of cladding 16. It should be appreciated that the more cladding 16 material one is able to remove, the lower the voltage required in the poling step. While this step has been described as conducted in the preform stage, it should be appreciated that this step may be performed even after the formation of waveguide 12.

Figure 4:
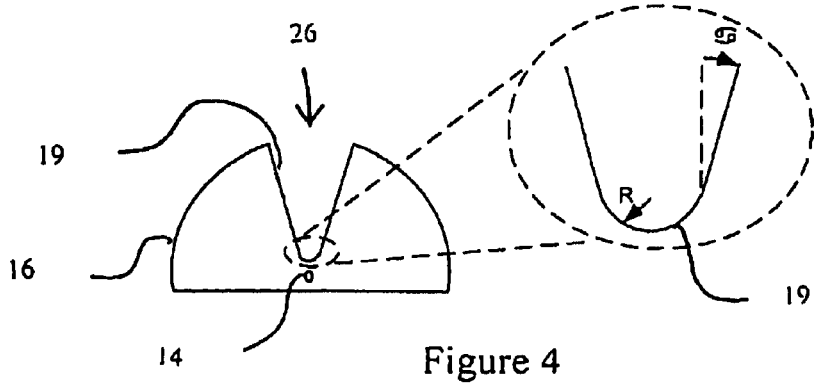
FIG. 4 is an exploded detail view of the recess of FIGS. 2, 3, and 5.

Turning now to FIG. 4, an exploded view of groove 26 is provided. As may be seen groove 26 has a surface 19 which is shown to be smooth and tapered for clarity. It should be appreciated that surface 19 may be abrupt and/or irregular without departing from the scope of the invention. As illustrated groove 26 is provided with a concave segment in contact with cladding 16 and has a surface 19 which is defined by R and $\alpha$. In a preferred embodiment, $\alpha$ would be between 0 and <=180 degrees and R would be between 0 and +infinity, and from −infinity to −r, i.e., having a concave or convex surface 19, respectively. Additionally, r is defined as the closet radius of curvature of a near circular waveguide core.

Next, a first electrically conductive material 20 may be deposited within grooves 26, thereby forming a first electrode 20. A major improvement of this invention is the use of cono-fusical projections 22 and 24 with and without first constructing electrode 20. Examples of cono-fusical projections 22 and 24 include, but are not limited to: knife edge, wires made with either metallic, semi-metallic or semiconducting materials, and conventional planar and non-planar deposited materials. The use of these projections 22 and 24 allow for a much simplified manufacturing process. As maybe seen in FIGS. 2 and 3, projections 22 and 24 are disposed in good electrical contact with groove or removed region 26. In a preferred embodiment, these projections would be in direct contact with the bottom of groove 26. By utilizing such a structure, the voltage that may be applied prior to breakdown may be significantly higher than that of either Brueck et al. or Fujiwara et al.

The use of such projections solves a long-felt need in the industry for a simple low-cost fabrication of waveguides 10, 10', 10", and 10'''. This is because one is able to position projections 22 and 24 very close to core 14 without significantly degrading either the structural integrity of waveguide segment 12 or the operational characteristics of waveguide segment 12. Another important feature of this approach is the ability to significantly reduce or eliminate any air gaps or pockets (as occurs in prior art devices) between projections 22,24 and cladding 16. These air gaps are a significant factor in the voltage needed for polling of such devices. Additionally, by using this approach, the modulation frequency is no longer limited to low values as in Fujiwara et al. since a high-speed travelling wave geometry is now possible. Furthermore, splicing to either end of the fiber is quite easy because of the electrodes would be disposed in groove 26. Thus, discrete optical system alignment for coupling into the fibers is no longer necessary. Finally, UV poling is possible with this device since access to cladding 16 is not inhibited.

Figure 3:
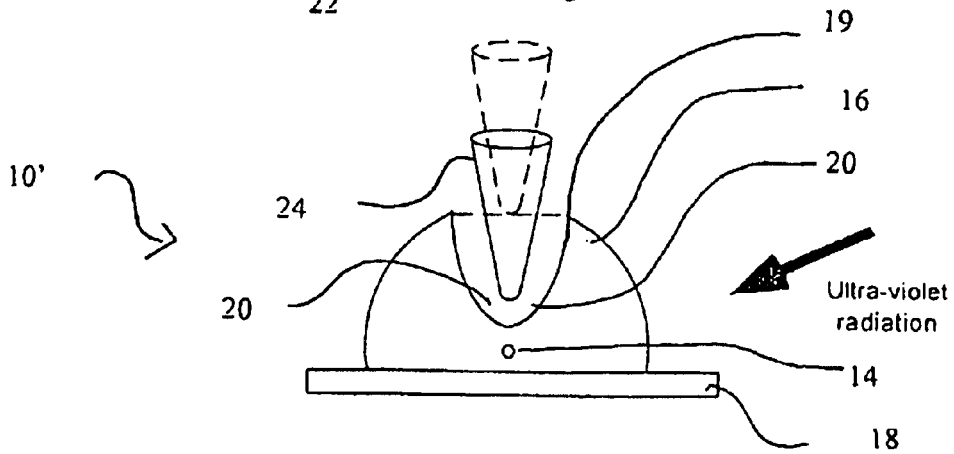
FIG. 3 is a cross sectional view of a electro-optic waveguide segment constructed in accordance with an alternate embodiment of the invention.

While we have discussed placing projections 22,24 in direct contact with cladding 16, it should be appreciated that cladding 16 may be entirely removed and projections 22,24 may contact core 14. Additionally, a contact 20,20 may be placed between projections 22,24 and core 14 as illustrated in FIGS. 2 and 3.

After projections 22,24 have been placed, waveguide segment 12 is poled using at least a electric field applied to projections 22,24 to induce an non-linearity in waveguide segment 12. It should be appreciated that by selecting the appropriate voltage, one may generate a specific non-linearity. Examples of these voltages include, but are not limited to: a DC voltage, an AC voltage, and pulsed. In a preferred embodiment, a DC voltage having a magnitude of 4 Kv was applied for 15 minutes.

One major improvement contemplated by this invention is the ability to pole waveguide segment 12 by using an applied voltage alone.

It should be appreciated that while the invention contemplates the use of only one input to pole waveguide 12, one may utilize the well known approaches of either Brueck et al. or Fujiwara et al. with the teachings of this invention. By this, applicant means that the poling step may be performed using ultraviolet light injected into cladding 16 in combination with said predetermined electric field, as illustrated in FIGS. 2 and 3. It should be appreciated that UV poling has produced the largest non-linearity, e.g. $r_{33}$=6.0 pm/V. Additionally, the poling step may be performed using the electrical field in combination with heating waveguide segment 12. Finally, all three inputs may be combined to significantly reduce the magnitude and/or duration of the predetermined electric field. It should be appreciated that while FIGS. 2 and 3 illustrate only one combination, any of the above combinations may be utilized with the teachings in these figures.

It should be appreciated that while the preferred embodiment utilizes projections 22,24, there are other methods of accomplishing this step. For example, contacts 18,20 may be formed before the poling step to allow an electrical interface to core 14.

The next step involves the placement of another electrode 18. It should be appreciated that there are several ways in which this step may be accomplished. The first method for accomplishing this is to place waveguide segment 10' on a second electrically conductive material 18 which is not in contact with electrode 20. In this manner, an electrical circuit is formed.

The physical affixing of waveguide segment 10 to electrically conductive material 18 may be accomplished in many ways well known in the prior art and therefore will not be discussed in any detail. After contacts 18 and 20 are positioned, waveguide 12 may be poled as discussed above. It should be appreciated that the teachings of the two embodiments may be combined in that one projection 20 or 22 may be used in conjunction with one or more contacts 18 and/or 20.

Finally, in one embodiment illustrated in FIGS. 3, 5 and 6, conductive material 20 may also be transparent. This would allow the ability to completely fill grooves 26 as illustrated in FIGS. 3, 5 and 6. This has a significant advantage in that it overcomes a major problem with prior art devices. By having optical material replaced in grooves 26, structural integrity of waveguide 12 is maintained. Thus, making it easier to package. Additionally, high modulation frequencies should be more obtainable for all of these structures.

Now that we have discussed the manufacturing of electro-optic waveguide segment 10, we will discuss its operation. Turning to FIG. 5, electro-optic waveguide segment 10 has been processed as described above. In particular, it has been poled to create a non-linearity that behaves differently in two orthogonal axes.

When voltage is applied to poled waveguide section 10, a phase shift created which is different for the two orthogonal polarization modes of waveguide 10. By applying appropriate voltages, one may introduce different phase shifts which scatter the input polarization mode to any other polarization mode and hence functions like a variable waveplate that is governed by the equation below:

$$v_\pi = \frac{D\lambda_0\ 1}{L_n^3(R_{33} - R_{31})}$$

where $V_\pi$ is the voltage required to introduce a $\pi$ phase shift between the two orthogonal linear eigenmodes of waveguide 12. Therefore, assuming $r_{33}$=0.3 pm/V, $\lambda_0$=1.55 μm, L=10 cm, one need D to equal 4 μm for $V_\pi$–50 V. If the input voltage is $V_{\pi/2}$ as illustrated in FIG. 5 and the input signal is linearly polarized, one would generate a circularly polarized output. It should be appreciated that this is merely one example of a particular non-linearity induced by poling. It should be appreciated that any desired phase effect may be generated by utilizing the teachings of the present invention.

Next, we shall discuss how to apply the above teachings to a waveguide segment having a tunable Bragg grating. It should be appreciated that the above devices have been poled while the devices discussed below may or may not be poled. In addition, details of the general processing steps are provided.

Tunable Bragg Grating

With reference to the Figures, wherein like references characters indicate like elements throughout the several views and, in particular, with reference to FIG. 6, a electro-optic waveguide segment having a tunable Bragg Grating 10''' is illustrated. The tunable Bragg grating waveguide segment 10''' comprises a fiber-optic waveguide 12 having a core 14 and cladding 16. Disposed in contact with waveguide 12 is a first electrical contact 18 and a second electrical contact 20 preferably on opposite sides of waveguide 12. Segments of high index material 28 are formed within core 14 by a process described below. As may be seen, there are alternating segments of high index material 28 and unmodified core 30, any two forming a period in the Bragg grating. For convenience, only a few periods have been illustrated, it should be appreciated that any number of periods may be formed as described below.

Turning now to the construction of tunable Bragg grating waveguide segment 10''', it should be appreciated that the teachings associated with waveguide 10 may be used in conjunction with this invention. The first step for manufacturing tunable Bragg grating waveguide segment 10''' is the selective removal of at least a part of cladding 16. FIGS. 2, 3, 5 and 6 illustrate how at least a portion of cladding 16 is removed. While it might appear in FIG. 2 that the cladding 16 is completely removed in certain regions, this is not the case. In fact, it is highly undesirable to completely remove cladding 16 in the embodiment illustrated in FIG. 2 while cladding 16 may be completely removed in the embodiment illustrated in FIG. 6. Applicant has found that by reducing the thickness of cladding 16, in select regions, so that the distance "D" between proximal faces of contacts 18 and 20 is less than 5 μm, one may significantly reduce the input voltage to second electrical contact 20 and achieve the same tunability of tunable Bragg grating waveguide segment 10'''. In the alternative, the voltage may be increased and a larger shift may be achieved in tunable Bragg grating waveguide segment 10'''. The voltage sensitivity of the operational tunable Bragg grating waveguide segment 10''' is described in detail below.

It should be appreciated that the term input voltage is quite different that the voltage used for poling. The input voltage is used for selective control of tunable Bragg grating waveguide segment 10''' while the poling voltage is used to create a non-linearity in tunable Bragg grating waveguide segment 10'''. As discussed above, tunable Bragg grating waveguide segment 10''' does not need to be poled to function and in certain instances, it is undesirable to pole tunable Bragg grating waveguide segment 10'''.

While it is preferable to maintain the proximal surfaces of cladding 16 in close proximity, it should be appreciated that this removal step may be eliminated so long as one is willing to induce a higher voltage into tunable Bragg grating waveguide segment 10'''. Additionally, applicant prefers to mechanically polish waveguide 12, but it should be appreciated that any chemical etching or other process means may be utilized to reduce the thickness of cladding 16. Several examples of other methods include, but are not limited to: chemical etching, ion beam etching, and laser etching.

The next step in the manufacturing process is the formation of Bragg gratings. This is performed in a conventional fashion by ultra-violet (UV) irradiation, using a holographic fringe pattern of two interfering beams. The uniform grating is constituted by periodic, linearly spaced regions 28 and 30 of alternating high and low refractive index material extending in the direction of light propagation. Preferably, the grating as initially formed has a total length of 5 mm and ~1000 periods. It is contemplated within the scope of the invention that the length and/or the number of periods may be modified. It should also be appreciated that Bragg gratings may be formed in core 14 and/or cladding 16. Additionally, it is contemplated that other post-processing operations may be performed to produce different structures, including for example, structures in which one or more concomitant regions of the grating are exposed to further, localized irradiation and including structures in which region of high refractive index 28 is irradiated to further increase the depth of refractive index modulation in that region. While the above discussion focuses on increasing the refractive index in region 28 with respect to region 30, it should be appreciated that the same effect may be achieved by reducing the refractive index of region 28 with respect to region 30. Therefore, as long as the process changes the relative refractive index between regions 28 and 30, a Bragg grating will be formed. Thus, any process for increasing or decreasing the refractive index is contemplated by this invention. Examples of such processes include, but are not limited to: ion etching, chemical etching, and ion-implantation.

In the preferred embodiment, the Bragg grating is formed before poling. This is the preferred process when there is: 1) no poling 2) poling by voltage alone, or 3) poling when thermal processes are involved. This is not the case in all embodiments. For example, if one is to utilize UV radiation in the poling process, it is preferable to pole first and then form Bragg grating after the poling step. For the rest of this discussion, we will assume that the Bragg grating is formed before poling.

The above description has discussed one particular method of forming Bragg gratings. It should be appreciated that any other method know in the art may be used to form Bragg gratings in conjunction with the teachings of this invention. Examples of such methods include, but are not limited to: phase masks, etching and redepositing of materials, holographic interfaces and prism interfaces.

After the Bragg gratings are formed, contacts 18 and 20 are deposited in the polished or removed regions 26. Any process for depositing electrically conductive material may be utilized in this step. Preferably, a vapor deposition process will be utilized, but other processes such as, but not limited to: sputtering may be substituted. In a preferred embodiment, contacts 18 and 20 would be made of either gold, chromium, aluminum, and/or nickel. It should be appreciated that contacts 18 and 20 may be of similar or different material. Additionally and material may be used for contacts 18 and/or 20 so long as the material has the property of electrical conductivity. Examples of such materials include, but are not limited to: gold, chromium, aluminum, palladium, and nickel. Contacts 18 and 20 preferably have profiles that do not exceed the removed region 26 of cladding 16, as shown by the dashed line in FIG. 3. FIGS. 5 and 6 illustrates contacts 18 and 20 as being at the same level as cladding 16. By having contacts 18 and 20 located substantially within removed regions 26, one is able to construct a more durable waveguide 12. While this feature may seem simple, it is counter intuitive in that having less material makes a structure that is substantially more durable in use.

Additionally, the use of a cono-fusical contacts or projections 22 and/or 24, such as but not limited to a wire or finger projection, may be used in conjunction with contacts 18 and/or 20. These contacts or projections 22 and/or 24 are preferably biased to engage contacts 18,20 or cladding 16 (if contacts 18,20 are not present) by a spring or other well known biasing means. As discussed above, there is no need for contacts 18,20 for the poling process. These contacts 18 and 20 are preferably used in the operational device.

It should be appreciated that by having contact 18 and/or 20 not exceeding removed region or groove 26, two major improvements are achieved. First, the alignment of conofusical contacts 22 and/or 24 is assisted by having a groove 26 to reside within. Second, and more importantly, the breakdown caused by air gaps is significantly reduced.

It should be appreciated that it is contemplated within the scope of the invention that contacts 18 and 20 may have profiles that exceed removed regions 26 as illustrated in FIG. 1. While this embodiment would be less desirable, it would still provide functionality to tunable Bragg grating waveguide segment 10''' and is considered within the scope of the invention.

It should be appreciated that any embodiment for waveguide segments 10, 10', and 10'' may be used in conjunction with the teachings for tunable Bragg grating waveguide segment 10'''.

In one embodiment, cladding 16 may be entirely removed or partially removed as illustrated in FIGS. 2, 3 and 5. As may be seen surface 19 is illustrated as being gradually tapered. While a gradual taper is the preferred embodiment, it should be appreciated that any interface may exist between cladding 16 and contacts 18 and 20. For example, FIG. 6 illustrates an abrupt edge or surface 19. In this embodiment, the material for contacts 18 and 20 has the additional feature of being optically transparent, i.e., allowing an optical signal to be transmitted therethrough. Examples of materials for optically transparent contacts 18 and 20 include, but are not limited to: heavily doped semiconductor such as polysilicate, indium, tin oxide, gallium arsenide, iridium phosphate, and aluminum arsenide.

Returning to the description of the preferred embodiment, the next step in the formation of tunable Bragg grating waveguide segment 10''' is optional. This step is the poling of tunable Bragg grating waveguide segment 10'''. This process is conducted as discussed above. In an embodiment, tunable Bragg grating waveguide segment 10''' would be poled by exposing waveguide 12 to a 260° C. environment for 15 minutes and applying a predetermined poled voltage of 4 Kv. It should be appreciated that the particular time and/or temperature may be varied and temperatures between 0° C. and 100° C. as well as times between 0 and three years are considered within the scope of the invention.

Finally, post-processing steps may be performed such as encasing at least a portion of tunable Bragg grating waveguide segment 10''' in a protective coating such as plastic or glass. It should be appreciated that this step is optional and is only provided to illustrate that further post-processing steps may be utilized in conjunction with the teachings of this invention.

It should be appreciated that while a particular sequence has been described above, the order of the steps may be modified so long as the teaching of the invention is utilized. An example of such a modification is the particular step at which the Bragg grating is formed. The grating may be formed at any step in the manufacturing process.

Now that the method for forming tunable Bragg grating waveguide segment 10''' has been described, we will discuss how the device functions. By applying a voltage ($V_t$), the average refractive index of tunable Bragg grating waveguide segment 10''' is modified. This, in turn, allows tunable Bragg grating waveguide segment 10''' to affect a wavefront by selectively reflecting and/or selectively passing particular frequencies through tunable Bragg grating waveguide segment 10'''. Thus, tunable Bragg grating waveguide segment 10''' may be viewed as a selective gate for allowing specific frequencies through while reflecting others. Now that the general concept has been described, the discussion shall turn to the mathematical relationships that allows for the selective control of tunable Bragg grating waveguide segment 10''.

The shift ($\Delta\lambda$) in the peak wavelength ($\lambda_B$) of tunable Bragg grating waveguide segment 10''' is due to a shift in the average refractive index in tunable Bragg grating waveguide segment 10'''. This may be defined as:

$$\Delta\lambda = \lambda_B \frac{\Delta n}{n} = \frac{\lambda_B}{2} r n^2 \frac{V_i}{D} \tag{1}$$

where r is the appropriate electro-optic (e-o) coefficient in the poled waveguide, n is the average refractive index of tunable Bragg grating waveguide segment 10''', $V_t$ is the applied voltage, D is the distance between proximal faces of electrodes 18 and 20.

The Bragg condition is defined as:

$$\Lambda = \frac{\lambda_B}{2n_m} \tag{2}$$

where $\Lambda$ is the period of tunable Bragg grating waveguide segment 10''', $n_m$ is the effective modal index, and $\lambda_B$ is the Bragg wavelength.

As may be seen, by controlling the formation process, setting the number of periods, and establishing the average refractive index of tunable Bragg grating waveguide segment 10''' during fabrication, one may design tunable Bragg grating waveguide segment 10''' to be tunable over any desired wavelength range. Thus, by pre-establishing the number of periods and the average refractive index, the change in wavelength is controllable by one variable: the magnitude of the applied voltage ($V_t$). Additionally, tuning speeds up to 10 GHz are capable, making such devices attractive for communication system components such as, but not limited to: reflection-type amplitude modulators.

This device has been fabricated and experimental results have been generated which track closely to the expected results. What follows is a discussion of a specific experiment and is provided by way of an example. It should be appreciated that the following is merely one example of the teachings of this invention and does not limit this invention to the specific design constraints enumerated in the example.

EXAMPLE 1

In this example, a D-shaped fiber optic waveguide 12, manufactured by KVH Corp. and having a 2×4 μm core diameter, was used for Bragg grating fabrication. This fiber optic waveguide 12 had a 15% $GeO_2$ concentration. Fiber optic waveguide 12 was processed with the flat side of the D-shaped fiber polished to ~8 μm from the core, with 1.5" pigtails.

After polishing, fiber optic waveguide 12 was exposed to hydrogen at 100 atm. and 50° C. for 2 days to increase its photosensitivity of waveguide 12. Next, the polished section of fiber optic waveguide 12 was exposed to 193 nm radiation from an ArF laser (20 mJ/pulse, 10 Hz) for 20 minutes through a phase mask to form the Bragg grating. The Bragg grating formation was monitored by coupling an edge emitting diode (ELED) source through the fiber and observing the transmission spectrum on an optical spectrum analyzer. This process produced a 13 dB reflective grating observed at 1558 nm which degraded to 7 dB reflectivity upon heating at 260° C. for 12 hours; peak reflectivity shifted to 1557 nm.

The fiber was then laid with the flat side down on a silicon (Si) substrate or contact 18 and a 30 μm polyamide layer was spin coated around it. After hard-baking the sample at 180° C. for 15 hours, a gold electrode 20 was deposited over the tunable Bragg grating 10. This device is illustrated in FIG. 6.

In order to establish a non-linearity in tunable Bragg grating waveguide segment 10''', the 70 μm thick fiber optic waveguide 12 was poled with 3.3 kV at 260° C. for 15 minutes. The ELED source was mechanically spliced to the D-shaped fiber pigtail through a 30:70 coupler which enables observation of the reflection spectrum of tunable Bragg grating 10. The other pigtail was mechanically spliced to a 9 μm core 1550 nm single mode fiber. Each mechanical splice had a loss of ~10 dB primarily due to the mode mismatch of the two fibers and the difficulty in alignment of the fiber cores.

Figure 7:
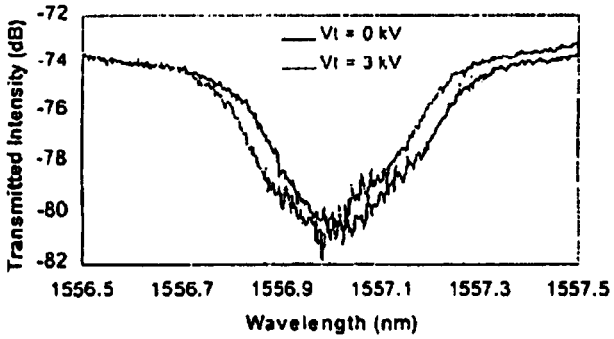
FIG. 7 is a graph of transmitted intensity v. wavelength for the electro-optic waveguide illustrated in FIG. 6 and constructed in accordance with an embodiment of the invention.

The reflection spectrum was observed instead of the transmission spectrum (as done conventionally) since the latter was noisy. FIG. 7 illustrates the spectral tuning performance of tunable Bragg grating 10 as a function of the applied voltage. As may be seen, ~0.02 nm (2.5 GHz) tuning is observed for an applied voltage of 3 kV.

Thus, the operational device tracks closely with the expected results.

Turning now to FIG. 5, an alternate embodiment of the invention is illustrated. For clarity, like elements have been provided with like reference numeral except that a double prime has been added to each reference numeral where there is a slight difference in the particular element in this embodiment. The following discussion will focus on the differences between the elements of this embodiment and that of the preferred embodiment.

As may be seen, a variable waveplate is illustrated as element 10''. The key difference between tunable Bragg grating waveguide segment 10'''' is the lack of high and low index material 22,22' which form Bragg gratings 10,10'. In all other respects, the teachings for the embodiments for waveguide segments 10,10' are applicable for tunable Bragg grating waveguide segment 10'''. Another significant difference is that tunable Bragg grating waveguide segment 10''' does not need to be poled.

Other Devices

Turning now to FIGS. 8 through 16, devices that utilize the teachings of the present invention are disclosed. It should be appreciated that these devices have novel features apart from the inventions discussed above. In particular, devices that discuss tunable Bragg gratings may use the novel Bragg gratings discussed above or any other know tunable Bragg grating. In addition, devices which discuss the use of electro-optic poled waveplates, may use the novel variable waveplates discussed above or any other waveplate known in the art. The key novelty, other than the specific configuration, is the departure from the approach of utilizing interfering wavefronts to selectively control signal propagation, to a new approach of utilizing polarization control to selectively control signal propagation.

Modulator

Figure 8:
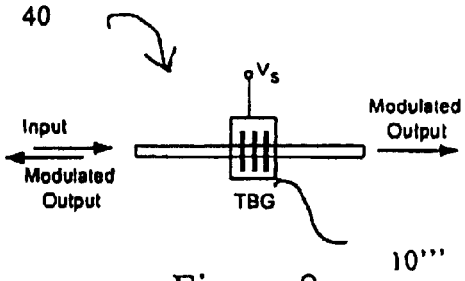
FIG. 8 is a cross sectional view of a modulator utilizing the electro-optic waveguide illustrated in FIG. 6.
Figure 9:
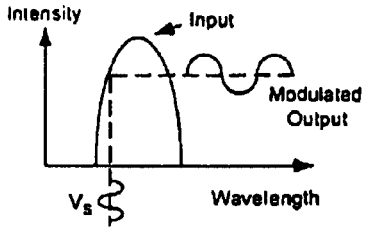
FIG. 9 is a graph of intensity v. wavelength for the modulator illustrated in FIG. 8.

The first device, illustrated in FIG. 8, is a modulator 40 that preferably utilizes the electro-optic waveguide 10''' illustrated in FIG. 6. As may be seen, modulator 40 comprises a fiber segment which is conventional in nature. An unmodulated input is inserted into this fiber segment which then comes into contact with tunable Bragg grating waveguide segment 10'''. Tunable Bragg grating waveguide segment 10''' has been designed to reflect a particular frequency and pass all other frequencies for a particular DC input voltage $V_t$ as illustrated in FIG. 7. Instead of applying a DC voltage, an AC input voltage $V_t$ is applied to Bragg grating waveguide segment 10'''. This input voltage is illustrated in FIG. 9. As may be seen, FIG. 9 is a graph of wavelength v. intensity for the modulator illustrated in FIG. 8. This AC input voltage causes the reflected wavelength to shift as discussed above in the operation of tunable Bragg grating waveguide segment 10'''. In devices employing other tunable Bragg gratings, a suitable control signal would be applied. Thus, two modulated outputs are generated, the reflected output is reflected back to the input port. The output port receives a modulated output which has a substantially reduced reflected frequency component.

Michelson Interferometer

Figure 10:
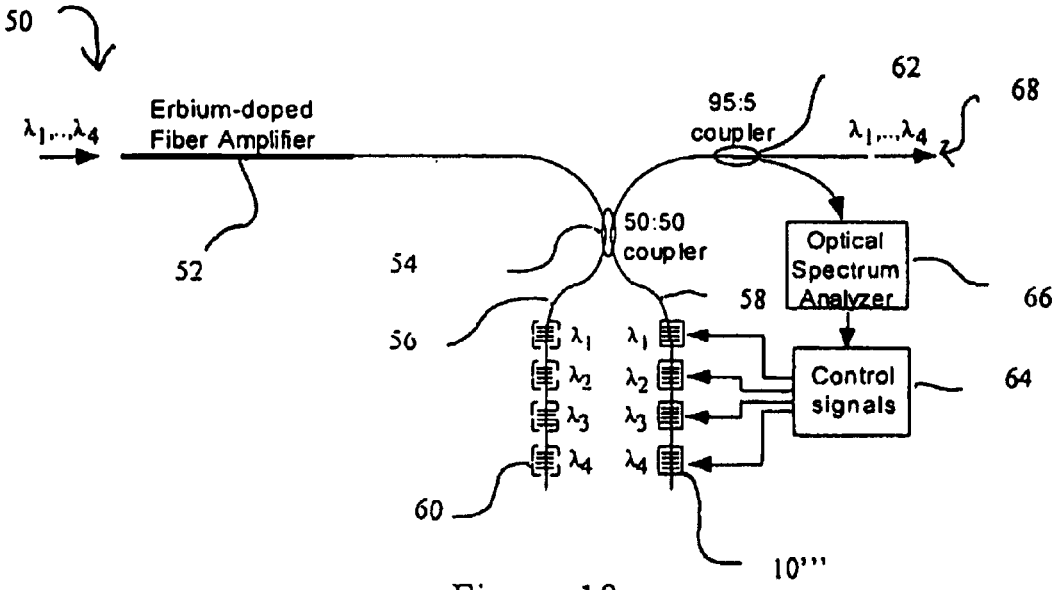
FIG. 10 is block diagram of a Michelson interferometer utilizing the electro-optic waveguide illustrated in FIG. 6.

The second device, illustrated in FIG. 10, is a Michelson interferometer 50 that preferably utilizes the electro-optic waveguide 10''' illustrated in FIG. 6.

In long-haul WDM-based telecom and datacom systems, the individual WDM channels undergo unequal amplification due to the non-flatness in the gain spectrum of the erbium-doped fiber amplifier (EDFA) 52. The amplified spontaneous emission (ASE) of optical amplifiers can significantly degrade the performance of WDM systems by saturating the gain of the EDFA. Variations in the gain within the bandwidth of the erbium amplifier will be compensated for by applying appropriate voltages to the different tunable Bragg grating waveguide segment 10''' in arm 58 and detuning their reflection spectra with respect to corresponding gratings 60 in the other arm 56 of Michelson interferometer 50.

The amplitude of the different input wavelengths after passing through the EDFA will preferably be split into two equal parts by the 50:50 coupler 54. These wavelengths will be reflected by appropriately designed matched Bragg gratings 10''' and 60 written in the two arms 56,58 of Michelson interferometer 50 of which one arm 58 will consist of tunable Bragg grating waveguide segment 10'''. In an alternate embodiment, both arms 56,58 would utilize tunable Bragg grating waveguide segment 10'''. For example, conventional Bragg gratings 60 may be replaced by tunable Bragg grating waveguide segment 10'''. This is illustrated in FIG. 10 by dashed boxes over Bragg gratings 60.

Upon reflection, the different wavelengths from arms 56 and 58 will interfere with each other and exit through output port 68. Preferably, a 95:5 coupler 62 at output port 68 will tap off 5% of the different wavelengths and feed them to an optical spectrum analyzer 64 which detects any variation in the amplitude for the different wavelengths and communicates it to the control signal generator 66 which in turn controls the input voltage to tunable Bragg grating waveguide segment 10'''.

Turning now to an example, suppose the amplitude of the wavelength channel at $\lambda_1$ is larger than that of the other channels, control signal generator 66 will send an appropriate voltage to tunable Bragg grating waveguide segment 10''' and cause a shift in the reflection spectrum of a respective tunable Bragg grating waveguide segment 10'''. Such a controlled mismatch in the reflectivities in the two arms 56,58 of the interferometer 50 should enable very precise gain equalization. $V_t$=5 V=>1 GHz offset=>0.3 dB detuning.

The proposed device is novel enough that there is no conventional devices to compare it with. However, the device that has a similar functionality is a acousto-optic tunable filter; but such devices are not as rugged as the electro-optic tunable filter described above and also involves exciting undesirable higher order modes in the fiber.

One possible drawback of the above Michelson interferometer-based device is that the two arms of the interferometer have to maintain a constant phase difference of $\pi/2$ for it to work without any back reflection losses. This can be circumvented by using a non-interferometric scheme described below. In this embodiment, coupler 54 would be replaced with a polarization splitter. The details of the polarization splitter are provided in conjunction with the discussion of FIG. 12.

Frequency Modulators

Figure 11:
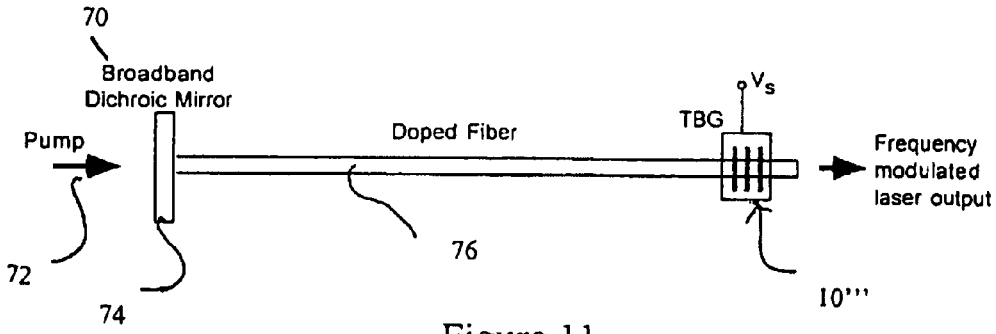
FIG. 11 is a block diagram of a frequency modulator utilizing the electro-optic waveguide illustrated in FIG. 6.

The third device, illustrated in FIG. 11, is a modulator 70 that preferably utilizes the electro-optic waveguide 10''' illustrated in FIG. 6. Tunable Bragg grating waveguide segment 10''' (whose bandwidth is much smaller compared to that of the input radiation) is biased in such a way that its reflection spectrum corresponds to the linear portion of the input radiation spectrum. Any change in the input voltage Vs will alter the refractive index of tunable Bragg grating waveguide segment 10''' which in turn shifts the reflection spectrum of the Bragg grating disposed in tunable Bragg grating waveguide segment 10'''. Thereby the amount of input radiation that is reflected is varied. If the transmitted or reflected radiation is monitored we will observe a modulated light signal that resembles the modulating input voltage Vs waveform as discussed in conjunction with FIGS. 8 and 9. A major advantage of this scheme over conventional modulators is its simplicity. Furthermore, the modulated output can be extracted either as the transmitted or the reflected radiation due to this in-line all-fiber device.

To construct a frequency modulator 70 from the teachings of modulator 40, a broadband dichroic mirror 74 is introduced at the input end of fiber 76. Radiation is launched into the fiber 76 to form a laser cavity with minor 74 at one end and tunable Bragg grating waveguide segment 10''' at the other end. Tunable Bragg grating waveguide segment 10''' is designed to give a narrowband reflection spectrum at the flat portion of gain bandwidth of the rare-earth-doped fiber 76. Hence the laser will produce radiation only within the narrow band of frequencies defined by tunable Bragg grating waveguide segment 10''' reflection spectrum.

Applying a modulating voltage to tunable Bragg grating waveguide segment 10''' changes the local refractive index of the poled fiber section which in turn shifts the reflection spectrum of tunable Bragg grating waveguide segment 10''' and hence modulates the output frequency of the fiber laser 70.

Conventional frequency modulation is done using a distributed feedback (DFB) semiconductor laser diode which has the drawback of chirping at high modulation frequencies (>100 MHz). Moreover, such laser diodes are not capable of producing a good circular spatial beam quality that is essential for efficient coupling into single-mode fibers. The proposed device can be modulated up to GHz frequencies and its all-fiber construction makes it attractive for splicing with other single mode fibers with negligible insertion loss.

Wavelength Add-Drop Multiplexer or Filter

Figure 12:
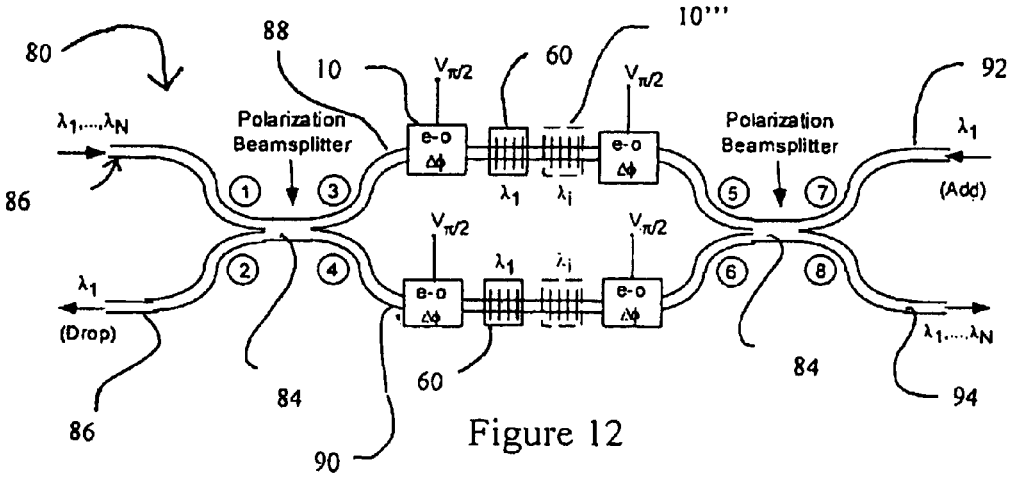
FIG. 12 is a block diagram of a wavelength add-drop multiplexer or filter constructed in accordance with a preferred embodiment of the invention and utilizing the electro-optic waveguides illustrated in FIGS. 2, 3, and 5.

The fourth device, illustrated in FIG. 12, is a wavelength add-drop multiplexer or filter 80 that preferably utilizes poled electro-optic waveguide 10, 10' and/or 10" illustrated in FIGS. 2, 3, and 5.

In this scheme, polarization beamsplitter 84 splits the input random polarization 82 into two orthogonal linear polarization states. These linear polarization states are converted to circular polarization states by poled electro-optic waveguide 10, 10' and/or 10" below and denoted as e-o in FIG. 12. Upon reflection from the Bragg gratings 60, the circular polarization changes its handedness and are subsequently converted to linear polarization states (orthogonal to the initial linear polarization state) upon passing through poled electro-optic waveguide 10, 10' and/or 10".

The polarization beamsplitter 84 works such that the vertical polarization switches over to the cross-port and the horizontal polarization goes to the through-port. Since the linear polarization states become orthogonal with respect to the original polarization state after being reflected by Bragg gratings 60, the light exits through the output port as two linear orthogonal polarizations.

In an alternate embodiment, tunable Bragg grating waveguide segment 10''' may be utilized in place of or in conjunction with Bragg gratings 60. In this embodiment, tunable Bragg grating waveguide segment 10''' may be configured to he between two frequencies of interest and then shifted to either of these frequencies by the application of an appropriate input voltage. Thus, the device would be capable of adding or dropping signals at two distinct frequencies.

Low insertion loss (<1 dB), low cross-talk (<−30 dB), and polarization insensitive add/drop multiplexers/filters (ADM) are attractive for high bit-rate WDM-based datacom and telecom applications. As discussed above, the random input polarization state 82 is split into two linear components by polarization beamsplitter 84. The linear polarizations are converted to circular polarization preferably by poled tunable $\lambda/4$ plate (or poled electro-optic waveguide 10, 10' and/or 10"). Upon reflection by grating 60, the polarizations of the wavelength channel corresponding to the Bragg wavelength ($\lambda_1$) are flipped to orthogonal states after passing through the tuned $\lambda/4$ plate. This channel then exits through port 2 which is denoted by reference numeral 86. Another channel (also at $\lambda_1$) can be added through port 5, denoted as reference numeral 92, using the same principle.

Bragg grating 60 in the above device is not perfectly matched to the source wavelengths and quite often the grating spectrum has to be shifted after the grating fabrication. Tunable Bragg grating waveguide segment 10''' is an elegant solution to this problem. Furthermore, it can also be used to match the reflection spectra of the gratings written on the two arms of the device described above.

If several wavelengths need to be simultaneously filtered among the input wavelengths, several matched tunable Bragg grating waveguide segment 10''' (that are resonant at those particular wavelengths) can be written on the two arms 88,90 of the above device 80. This feature is unique to the polarization manipulation-based scheme used in our device.

In conventional Mach Zehnder interferometer-based wavelength add-drop filters, the two arms have to be phase-matched; i.e., the light propagating in the two arms should maintain a constant phase difference between them. This is difficult to achieve in practice, and is affected by changes in temperature and strain of the fiber. The proposed device is much more attractive compared to Mach Zehnder interferometer-based filters because of the non-interferometric scheme (its operation is not phase-sensitive) used.

High-Speed Switch

Figure 13:
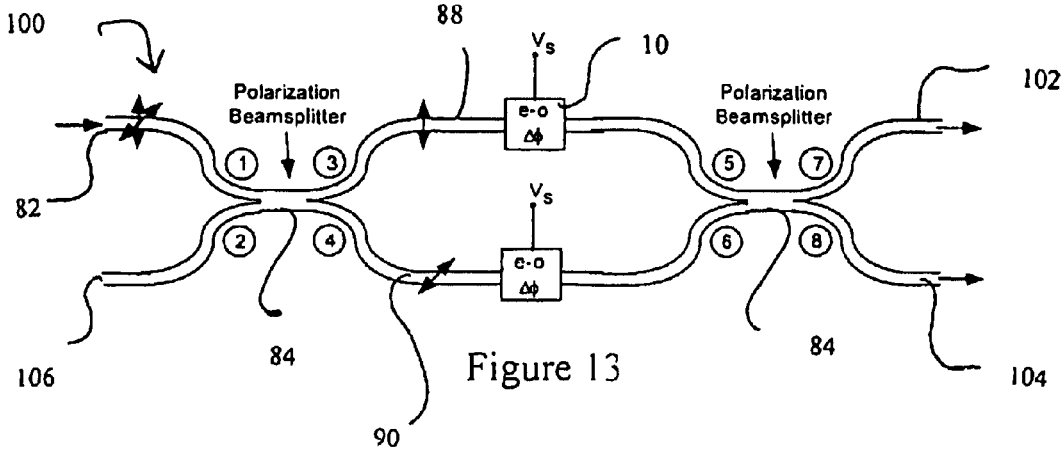
FIG. 13 is a block diagram of a high-speed 1×2 switch constructed in accordance with a preferred embodiment of the invention and utilizing the electro-optic waveguides illustrated in FIGS. 2, 3, and 5.

The fifth device, illustrated in FIG. 13, is a high-speed 1×2 switch 100 that preferably utilizes poled electro-optic waveguide 10, 10' and/or 10" illustrated in FIGS. 2, 3, and 5.

Random input polarization 82 is split in to two linear components by polarization beamsplitter 84. Polarization beamsplitter 84 is designed in such a way that the vertical polarization mode goes through in the same input fiber 106 whereas the horizontal polarization mode switches over to the coupled fiber 102,104. If no voltage is applied to poled electro-optic waveguide 10, 10' and/or 10" (denoted as e-o in FIG. 13), the vertical polarization mode goes through to port 7, the horizontal polarization mode couples back to the original input fiber and hence both the linearly polarized modes exit through port 7.

If a voltage of $V_\pi$ is applied to poled electro-optic waveguide 10, 10' and/or 10", it acts as a half-wave-plate and rotates the polarization mode in the two arms 88,90 to its orthogonal linear polarization modes. The original vertical polarization becomes horizontal polarization and couples into port 8. Similarly the original horizontal polarization in the other arm becomes vertical polarization and also exits through port 8.

The major advantage in the above device is the non-interferometric scheme employed which makes the operation of the switch relatively insensitive to environmental (such as temperature and strain) variations and any relative phase changes between the two arms 88,90 of the device 100.

Amplitude Modulator

Figure 14:
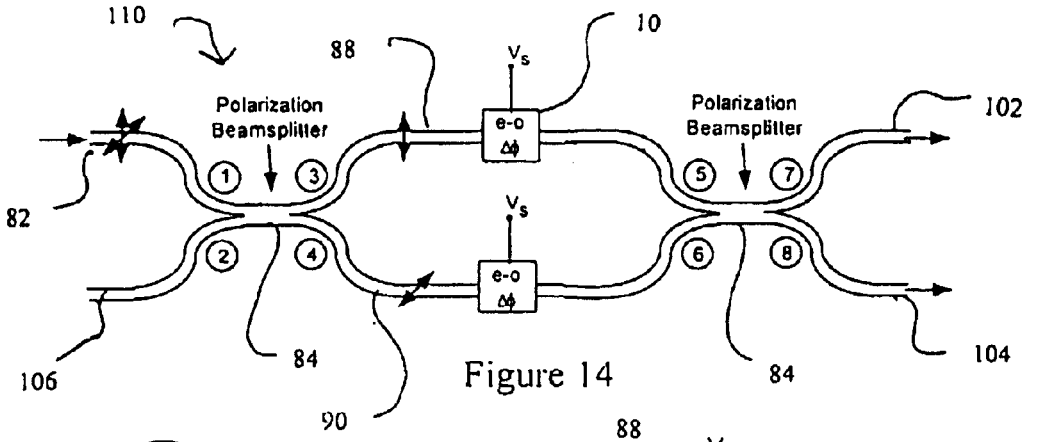
FIG. 14 is a block diagram of an amplitude modulator constructed in accordance with a preferred embodiment of the invention and utilizing the electro-optic waveguides illustrated in FIGS. 2, 3, and 5.

The sixth device, illustrated in FIG. 14, is an amplitude modulator 110 that preferably utilizes poled electro-optic waveguide 10,10' and/or 10" illustrated in FIGS. 2, 3, and 5.

The principle of operation of this device is similar to that of the 1×2 switch 100 described above except that the voltage applied to the poled section in this case is a continuous waveform instead of the discrete DC levels employed in the above device. In contrast to the 1×2 switch 100 where the linear polarization states in the two arms 88,90 are switched between two discrete states, the variable waveplate continuously changes the polarization state in the two arms into elliptical, circular, and linear polarization states. These polarization states are resolved by the polarization beamsplitter 84 at the output end to distribute the light in the two arms at port 5 and 6 between ports 7 and 8. Thus, if we monitor one of the output ports (7 or 8) we will detect modulated light whose waveform resembles that of the voltage applied to poled electro-optic waveguide 10, 10' and/or 10".

The major advantage in the above device is the non-interferometric scheme employed which makes the operation of the switch relatively insensitive to environmental variations. Moreover, a DC bias voltage is not required as for the case of a Mach-Zehnder interferometer based amplitude modulator conventionally used.

Reflection Isolators

Figure 15:
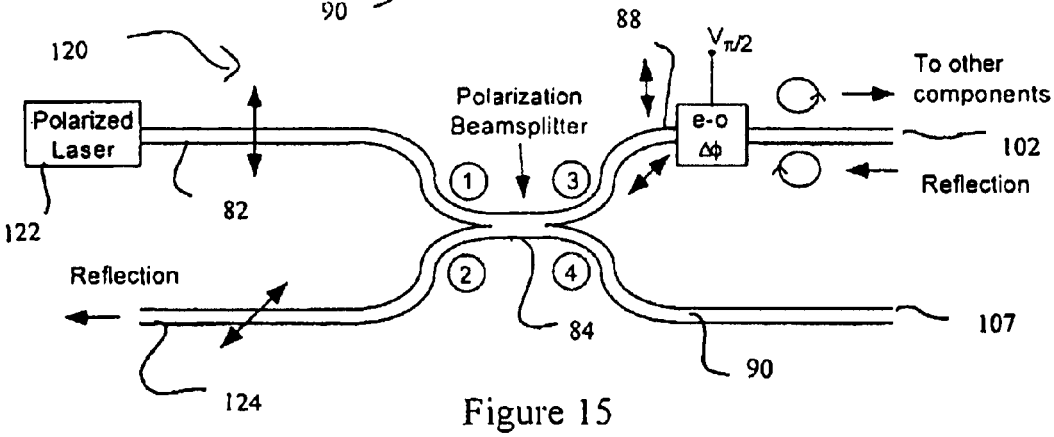
FIG. 15 is a block diagram of a reflection isolator for a polarized source constructed in accordance with a preferred embodiment of the invention and utilizing the electro-optic waveguides illustrated in FIGS. 2, 3, and 5.
Figure 16:
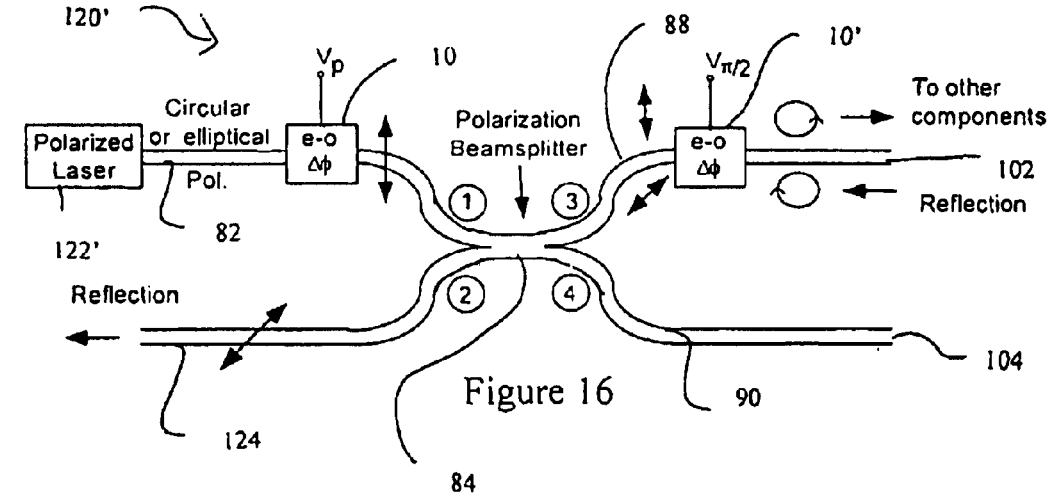
FIG. 16 is a block diagram of an alternate embodiment of the isolator illustrated in FIG. 15, but having an unpolarized source.

The seventh and eight devices, illustrated in FIGS. 15 and 16, are reflection isolators 120,120' that preferably utilizes poled electro-optic waveguide 10, 10' and/or 10" illustrated in FIGS. 2, 3, and 5.

The polarization beamsplitter 84 is designed to pass the input linearly polarized (vertically polarized in the case illustrated above) laser radiation and cross-couple the orthogonal polarization. The poled electro-optic waveguide 10, 10' and/or 10" (denoted as e-o in FIGS. 15 and 16) is configured to act as a quarter-wave-plate which converts the linear polarization into circularly polarized light.

Upon reflection from external components 102, the circular polarization reverses its handedness (to attain the orthogonal polarization state) and after passing through poled electro-optic waveguide 10, 10' and/or 10" becomes horizontally polarized. The polarization beamsplitter 84 subsequently cross-couples this polarization so that it exits through port 2. Thus any reflected radiation is prevented from reaching the source 122 or in other words, the polarized source 122 is "isolated" from any reflections from external components.

If the radiation from the laser source 122' is not linearly polarized but has a definite polarization (circular or elliptical), then we can introduce a poled electro-optic waveguide 10, 10' and/or 10" at the input end of the isolator device 120' and convert the input polarization to linear polarization of desired orientation. In case the input polarization is random, the isolator will still perform the function described above but will involve an additional insertion loss of up to 3 dB.

There is no comparable all-fiber isolator that has been demonstrated to date. The conventional device is a bulk Faraday isolator which involves coupling light out of the fiber and then back into the fiber and thereby introduces an insertion loss of >1 dB.

It will be apparent to those skilled in the art that the present invention has many uses and applications and may be practiced other than were specifically described herein. There are a host of applications for the invention, some of which are listed here: 1) integrated Mach-Zender interferometers and other switching structures for high speed switching; 2) A/D conversion, 3) waveguide crossbar switches, 4) electronically tunable filters for communication multiplexers/demutiplexers; 5) waveguide optical parametric oscillators; waveguide sum and difference frequency generation; and 6) second harmonic generation in waveguides with counter-propagating fundamental frequency beams.

Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A method for manufacturing an electro-optic waveguide segment having a core and a cladding; the method comprising the steps of:

forming a Bragg grating in said waveguide segment;

removing a first selective portion of said cladding above at least a portion of said Bragg grating to form a first recess within said cladding, said first selective portion having an outer dimension which is less than an unmodified section of said cladding;

depositing a first electrically conductive material covering at least part of said first selective portion and in direct contact with a deepest portion of said first recess, thereby forming a first electrode, wherein there are substantially no air gaps between said first electrode and said first recess;

removing a second selective portion of said cladding to form a second recess within said cladding, said second selective portion having an outer dimension which is less than an unmodified section of said cladding, said first and second selected portions not contacting one-another;

depositing a second electrically conductive material covering at least part of said second selective portion and in direct contact with a deepest portion of said of said second recess, thereby forming a second electrode, wherein there are substantially no air gaps between said second electrode and said second recess; and poling said waveguide segment using at least a electric field applied to either said first or second electrode to induce an non-linearity in said waveguide segment.

2. The method recited in claim 1, wherein said first recess is substantially filled with said first electrically conductive material.

3. The method recited in claim 2, wherein said first electrically conductive material is optically transparent.

4. The method recited in claim 1, wherein said second recess is substantially filled with a second electrically conductive material.

5. The method recited in claim 4, wherein said second electrically conductive material is optically transparent.

6. The method recited in claim 1 wherein said poling step is performed using ultraviolet light injected into said waveguide segment in combination with said electric field.

7. The method recited in claim 1, wherein said poling step is performed using said electrical field in combination with heating said waveguide segment.

8. A method for manufacturing an electro-optic waveguide segment having a core and a cladding; the method comprising the steps of:

forming a Bragg grating in said waveguide segment;

removing a first selective portion of said cladding above at least a portion of said Bragg grating to form a first recess within said cladding, said first selective portion having an outer dimension which is less than an unmodified section of said cladding;

depositing a first electrically conductive material covering at least part of said first selective portion and in direct contact with a deepest portion of said first recess, thereby forming a first electrode, wherein there are substantially no air gaps between said first electrode and said first recess;

removing a second selective portion of said cladding to form a second recess within said cladding, said second selective portion having an outer dimension which is less than an unmodified section of said cladding, said first and second selected portions not contacting one-another;

depositing a second electrically conductive material covering at least part of said second selective portion and in direct contact with a deepest portion of said second recess, thereby forming a second electrode, wherein there are substantially no air gaps between said second electrode and said second recess; and poling said waveguide segment using ultraviolet light injected into said waveguide segment to induce an non-linearity in said waveguide.

9. A method for manufacturing an electro-optic waveguide segment having a core and a cladding; the method comprising the steps of:

forming a Bragg grating in said waveguide segment;

removing a first selective portion of said cladding above at least a portion of said Bragg grating to form a first recess within said cladding, said first selective portion having an outer dimension which is less than an unmodified section of said cladding;

depositing a first electrically conductive material covering at least part of said first selective portion and in direct contact with a deepest portion of said first recess, thereby forming a first electrode, wherein there are substantially no air gaps between said first electrode and said first recess;

removing a second selective portion of said cladding to form a second recess within said cladding, said second selective portion having an outer dimension which is less than an unmodified section of said cladding, said first and second selected portions not contacting one-another;

depositing a second electrically conductive material covering at least part of said second selective portion and in direct contact with a deepest portion of said second recess; and poling said waveguide segment by heating said waveguide segment in combination with ultraviolet light injected into said waveguide segment to induce an non-linearity in said waveguide segment.

10. A method for manufacturing an electro-optic waveguide segment having a core and a cladding; the method comprising the steps of:

removing a first selective portion of said cladding to form a first recess within said cladding, said first selective portion having an outer dimension which is less than an unmodified section of said cladding;

removing a second selective portion of said cladding to form a second recess within said cladding, said second selective portion having an outer dimension which is less than an unmodified section of said cladding, said first and second selected portions not contacting one another;

depositing a first electrically conductive material within said first recess and in direct contact with a deepest portion of said first recess, thereby forming a first electrode, wherein there are substantially no air gaps between said first electrode and said first recess;

depositing a second electrically conductive material within said second recess and in direct contact with a deepest portion of said second recess, thereby forming a second electrode, wherein there are substantially no air gaps between said second electrode and said second recess; and poling said waveguide segment using at least a electric field applied to said first and second selective portions to induce a non-linearity in said waveguide segment.

11. The method for manufacturing recited in claim 10, further comprising the step of forming a Bragg grating in said waveguide segment.

*12. An optical frequency modulator, comprising:*

*a first optical fiber having first and second ends;*

*a mirror optically coupled to the first optical fiber first end, the mirror having a first surface configured to receive a light input signal and a second surface to reflect light from the first optical fiber first end back into the first optical fiber first end; and*

*a tunable Bragg grating waveguide having an optical input, an optical output and a control input, the optical input being optically coupled to the first optical fiber second end and the optical output configured to produce an output light signal, wherein the control input is configured to receive a control signal that controls the tunable Bragg grating waveguide, wherein the tunable Bragg grating comprises a second optical fiber having an electro-optically active core, and a cladding, wherein the control input comprises a pair of electrodes, each electrode disposed in one of a pair of grooves in the cladding, the pair of grooves opposed across the core and wherein each of the electrodes comprises electrically conductive material deposited in the groove by vapor deposition or sputtering.*

*13. The modulator of claim 12 wherein the Bragg grating waveguide is configured to reflect light of selected wavelengths back into the fiber optical fiber second end and thereby form a laser with the mirror and the first optical fiber, the output light signal being a laser light output signal.*

*14. The modulator of claim 12 wherein the Bragg grating waveguide is integrally formed within the first optical fiber.*

*15. The modulator of claim 12 wherein the control input of the Bragg grating waveguide is configured to receive the control signal and the Bragg grating waveguide is adapted to pass selected wavelengths in dependence on the control signal applied to the control input.*

*16. The modulator of claim 15 wherein the control input is configured to receive a voltage and the Bragg grating waveguide is adapted to pass the selected wavelengths in dependence on the voltage applied to the control input.*

*17. The modulator of claim 15 wherein the control input is configured to receive a time-varying control signal and the Bragg grating waveguide is adapted to pass selected wavelengths that vary in dependence on the time-varying control signal applied to the control input.*

*18. The modulator of claim 15 wherein the control input is configured to receive a non-time-varying control signal and the Bragg grating waveguide is adapted to pass selected wavelengths that are fixed in dependence on the non-time-varying control signal applied to the control input.*

*19. A method for optical frequency modulation, comprising:*

*providing light to a first optical fiber first end through a mirror having a reflective side facing the first optical fiber first end to reflect light from the first optical fiber first end back into the first optical fiber first end;*

*positioning a tunable Bragg grating waveguide to receive light from a second end of the first optical fiber, wherein the tunable Bragg grating comprises an optical fiber with an electro-optically active core, and a cladding and a pair of electrodes, each electrode disposed in one of a pair of grooves in the cladding, the pair of grooves opposed across the core, wherein each of the electrodes comprises electrically conductive material deposited in the groove by vapor deposition or sputtering; and controlling the tunable Bragg grating waveguide to allow light of selected wavelengths to pass through the tunable Bragg grating waveguide to an output.*

*20. The method of claim 19 wherein controlling the tunable Bragg grating waveguide comprises applying a control signal to a control input wherein the selected wavelengths passed through the tunable Bragg grating waveguide are dependent on the control signal.*

*21. The method of claim 20 wherein the control signal is a time-varying control signal and the selected wavelengths passed through the tunable Bragg grating waveguide are varied in dependence on the time-varying control signal applied to the control input.*

*22. The method of claim 20 wherein the control signal is a non-time-varying control signal and the selected wavelengths passed through the tunable Bragg grating waveguide are fixed in dependence on the non-time-varying control signal applied to the control input.*

*23. The modulator of claim 12 wherein the Bragg grating waveguide has a refractive index that is configured to change in response to the control signal.*

*24. The modulator of claim 12 wherein the mirror is configured to receive the light input signal having a broad bandwidth and to reflect light having a broad bandwidth from the first optical fiber first end back into the first optical fiber first end.*

*25. The modulator of claim 24 wherein the Bragg grating waveguide is configured to receive the light from the first optical fiber second end having a broad bandwidth and to pass light having a bandwidth more narrow than the bandwidth of the input light signal to thereby produce the output light signal.*

*26. The modulator of claim 12 wherein the first optical fiber is a rare-earth doped optical fiber.*

*27. The modulator of claim 12 wherein the Bragg grating waveguide is a poled waveguide.*

*28. The method of claim 20 wherein the control signal is a voltage and the selected wavelengths passed through the tunable Bragg grating waveguide are dependent on the voltage applied to the control input.*

*29. The method of claim 19 wherein controlling the tunable Bragg grating waveguide comprises altering a refractive index of the tunable Bragg grating waveguide.*

*30. The method of claim 19 wherein the tunable Bragg grating waveguide is integrally formed within the first optical fiber.*

*31. An optical frequency modulator, comprising:*

*a first optical fiber having first and second ends;*

*a mirror optically coupled to the first optical fiber first end, the mirror having a first surface configured to receive a light input signal and a second surface to reflect light from the first optical fiber first end back into the first optical fiber first end; and*

*an electro-optic tunable Bragg grating waveguide having an optical input, an optical output and a control input, the optical input being optically coupled to the first optical fiber second end and the optical output configured to produce an output light signal, wherein the control input is configured to receive a control signal that controls the tunable Bragg grating waveguide, wherein the tunable Bragg grating comprises a second optical fiber having an electro-optically active core, a cladding, wherein the control input comprises a pair of electrodes, each electrode disposed in one of a pair of grooves in the cladding, the pair of grooves opposed across the core and wherein each of the electrodes comprises cono-fusical projections of electrically conductive material deposited in the groove by vapor deposition or sputtering.*

* * * * *